United States Patent
Benkley et al.

(10) Patent No.: US 11,674,072 B2
(45) Date of Patent: Jun. 13, 2023

(54) MIXTURE WITH POZZOLANIC MATERIAL FOR CONTROLLING ANNULAR PRESSURE-BUILDUP IN A WELLBORE

(71) Applicant: Halliburton Energy Services, Inc., Houston, TX (US)

(72) Inventors: James Benkley, Duncan, OK (US); Thomas Jason Pisklak, Cypress, TX (US); Samuel J. Lewis, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/513,439

(22) Filed: Oct. 28, 2021

(65) Prior Publication Data
US 2023/0136283 A1    May 4, 2023

(51) Int. Cl.
*C09K 8/42* (2006.01)
*C09K 8/467* (2006.01)

(52) U.S. Cl.
CPC .............. *C09K 8/467* (2013.01); *C09K 8/424* (2013.01)

(58) Field of Classification Search
None
See application file for complete search history.

(56) References Cited

U.S. PATENT DOCUMENTS

| | | | |
|---|---|---|---|
| 7,178,590 B2 | 2/2007 | Vargo, Jr. et al. | |
| 7,617,872 B1 | 11/2009 | Kubala et al. | |
| 9,487,691 B2 | 11/2016 | Ravi et al. | |
| 10,087,354 B2 | 10/2018 | Bryant et al. | |
| 2012/0012034 A1* | 1/2012 | Guynn | C04B 7/26 106/713 |
| 2013/0153214 A1* | 6/2013 | Roddy | C09K 8/03 507/276 |
| 2020/0270507 A1* | 8/2020 | Han Tan | C09K 8/487 |
| 2020/0399524 A1 | 12/2020 | Pisklak et al. | |
| 2021/0032526 A1* | 2/2021 | Pisklak | C09K 8/487 |

FOREIGN PATENT DOCUMENTS

WO    2015126395 A1    8/2015

OTHER PUBLICATIONS

Pandey et al., Waste Recycled Glass Powder as a Pozzolanic Additive for Cementing Oil WII:, American Association of Drilling Engineers, Fluids Technical Conference and Exhibition, Houston, Texas, 2014, 4 pages.
Williamson et al., "Control of Contained-Annulus Fluid Pressure Buildup", Society of Petroleum Engineers, Drilling Conference, Amsterdam, The Netherlands, 2003, 7 pages.
Halliburton Energy Services, Inc., International Search Report and Written Opinion, PCT/US2022/046279, dated Feb. 1, 2023, 10 pages.

* cited by examiner

*Primary Examiner* — Andrew Sue-Ako
(74) *Attorney, Agent, or Firm* — Kilpatrick Townsend & Stockton LLP

(57) ABSTRACT

A treatment fluid can be provided for controlling annular pressure-buildup in a wellbore. The treatment fluid can include a base fluid and a pozzolanic material that can be dispersed within the base fluid. The pozzolanic material can cause the treatment fluid to controllably consolidate in an annulus of the wellbore for controlling annular pressure-buildup in the wellbore.

20 Claims, 3 Drawing Sheets

MIXTURE WITH POZZOLANIC MATERIAL FOR CONTROLLING ANNULAR PRESSURE-BUILDUP IN A WELLBORE

TECHNICAL FIELD

The present disclosure relates generally to wellbore operations and, more particularly (although not necessarily exclusively), to a treatment fluid having a pozzolanic material for mitigating annular pressure-buildup in a wellbore.

BACKGROUND

A wellbore can be formed in a subterranean formation for extracting produced hydrocarbon material or other suitable material. The wellbore may experience or otherwise encounter one or more wellbore operations. The wellbore operations can include cementing, production, stimulation, or other suitable wellbore operations. The wellbore operations can involve positioning fluids in the wellbore and may additionally involve heating operations for various purposes. The fluids may be positioned or otherwise trapped in an annulus of the wellbore and may absorb heat from wellbore operations or from other suitable heat sources. In response to absorbing the heat, the fluids may expand or may otherwise cause pressure in the annulus to increase. Pressure in the annulus may increase enough, via the fluids, to cause a collapse of, or other related damage associated with, the wellbore. Other techniques to control the pressure in the annulus may not be effective. For example, using improved casings may not reduce the annular pressure, cementing the annulus may be inefficient, impractical, and may use excessive amounts of resources, etc.

DETAILED DESCRIPTION

Figure 1:
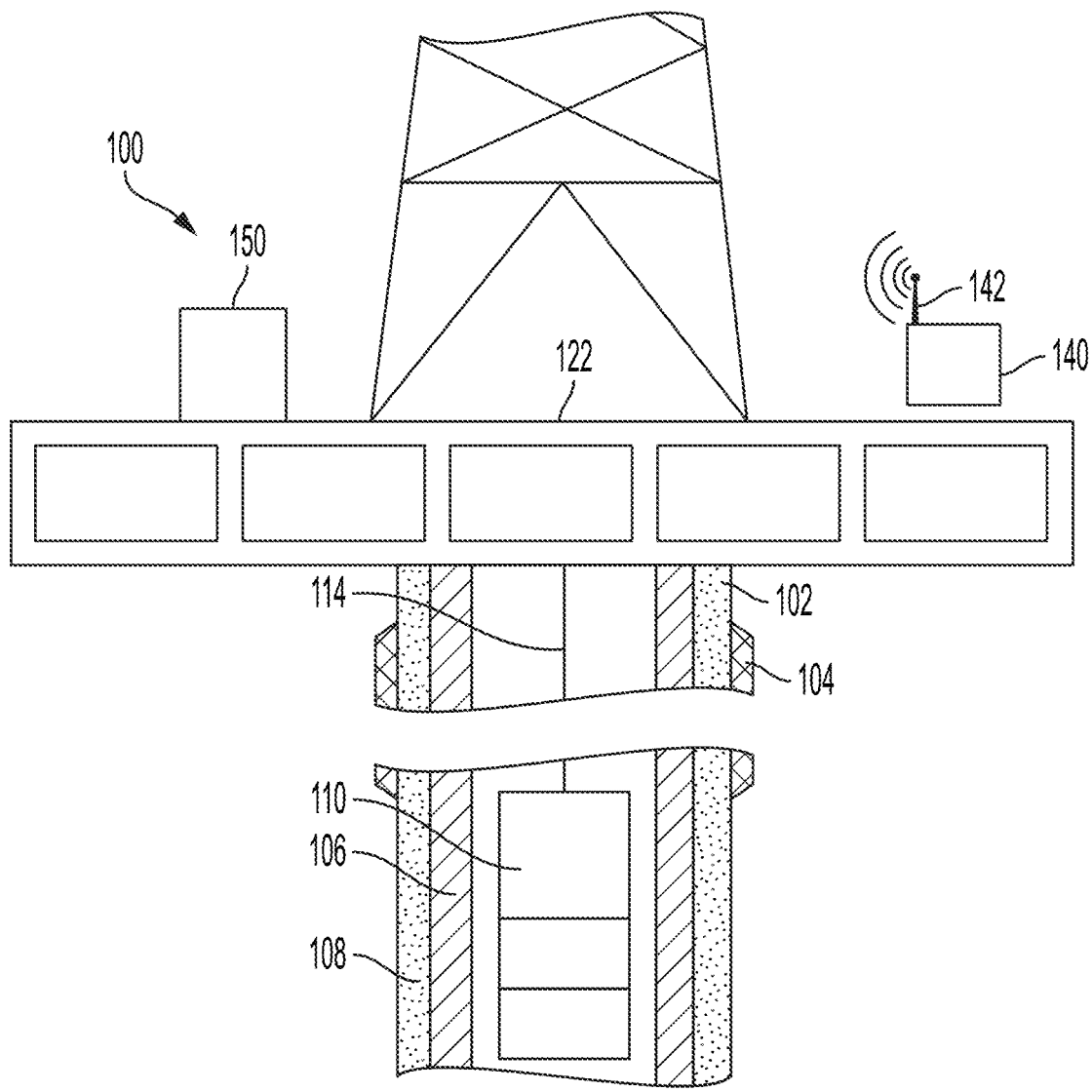
FIG. 1 is a diagram of a well system having a wellbore that includes an annulus in which efficiency fluid can be positioned and consolidated according to one example of the present disclosure.

Certain aspects and examples of the present disclosure relate to a treatment fluid that includes a pozzolanic material and that is usable in a wellbore for reducing or otherwise controlling annular pressure-buildup in the wellbore (e.g., during wellbore operations). The treatment fluid can be or otherwise include an efficiency fluid that can perform spacer operations (e.g., cleaning the wellbore, etc.) and that can additionally at least partially set. For example, the treatment fluid can include pozzolanic material (e.g., crushed glass material, clays, etc.) that may perform the spacer operations and may allow the treatment fluid to transition from a fluid to a gel-like state, which can include a hardened gel. The pozzolanic material can include post-consumer recycled glass or other suitable pozzolanic material that can perform spacer operations and that can allow the treatment fluid to at least partially set in the annulus of the wellbore. Annular pressure-buildup can occur in the wellbore in response to heating in the wellbore and can cause a collapse in the wellbore or other undesirable effects. The treatment fluid may include a thermal expansion coefficient that is lower (i.e., expands under heat less) than other fluids trapped in the annulus of the wellbore or used for reducing annular pressure-buildup in the wellbore. Additionally, the treatment fluid may not be hydraulic (i.e., the treatment fluid may not transmit pressure when positioned in the wellbore) subsequent to controllably consolidating in the wellbore.

Annular pressure-buildup may be induced or otherwise caused by high-temperature tubing fluid that may heat trapped annular fluid during production or during other suitable phases of a hydrocarbon well. As the annular fluid is heated, the annular fluid may thermally expand, which can lead to, or otherwise cause, a collapse of casing strings of a wellbore. Other techniques for reducing annular pressure-buildup may include leaving cement short of previous casings, enhancing casing designs using heavyweight or high yield casings, and the like. But, the other techniques may not efficiently reduce the annular pressure-buildup.

Mitigation of annular pressure-buildup can be costly, and other solutions to annular pressure-buildup may rely upon highly specialized spacer systems or unusual downhole equipment to mitigate annular pressure-buildup. The other solutions may additionally include full-height cementing, which can include pumping enough cement to fill the entire annulus. Although effective, full-height cementing is not efficient and uses excessive amounts of resources.

Pozzolanic material can be used in wellbore fluids to address challenges related to annular pressure-buildup. Pozzolanic material can include glass (e.g., the crushed glass material, glass bubbles, etc.), clays (e.g., calcined clays, kaolinite clays, etc.), ash (e.g., fly ash, bottom ash, etc.), volcanic rock, cenospheres, diatomaceous earth, shale, zeolite, ground vitrified pipe, or other suitable pozzolanic material. The pozzolanic material can be included in various fluids for causing the fluids to at least partially consolidate or set. Consolidation can result in various types of material. For example, a first type of consolidation can result in a gel-like material that can be moved or pumped when the hydraulic shear-stress exceeds the yield point of the gel-like material. A second type of consolidation can result in a plastic semi-solid that can experience plastic deformation if one or more stresses applied to the semi-solid exceed a plastic yield limit of the semi-solid. A third type of consolidation can result in a rigid solid similar to set cement. The pozzolanic material, when applied to or otherwise included in the wellbore fluids, can cause the wellbore fluids to experience the first consolidation type and, in some examples, the second consolidation type. In some examples, the pozzolanic material may not cause the wellbore fluids to experience the third consolidation type. Accordingly, the consolidation described herein of the treatment fluids or efficiency fluids having pozzolanic material may refer to the first type of consolidation or the second type of consolidation.

Low-cost pozzolanic slurries or treatment fluids can be used to address challenges relating to annular fluid heating in a wellbore. The pozzolanic slurries can initially (e.g., upon positioning the slurries in the wellbore) act as spacers that can remove drilling mud and otherwise clean the wellbore. Over time, the pozzolanic slurries can consolidate into hardened gels, gels having low compressive strength, or a combination thereof. The hardened gels can expand to occupy annular space of the wellbore, and, unlike other spacer fluids, may be highly resistant to thermal expansion due to temperature changes during production or other suitable wellbore operations. Accordingly, the pozzolanic slurries can be used as a dual-purpose fluid for spacer operations and for mitigation of annular-pressure buildup.

An efficiency fluid, such as low-cost pozzolanic slurries, may include one or more types of fluids that are intended to at least partially controllably consolidate. The efficiency fluid can include a crushed glass or glass-like material. The crushed glass material can include recycled or recyclable glass (e.g., post-consumer glass), lime, and other suitable pozzolanic material to consolidate in the wellbore and ahead of a cementing operation. The crushed glass material can be used to consolidate in the annulus of the wellbore, which can result in full-height consolidation in the wellbore with the pozzolanic material.

The efficiency fluid can be positioned in the wellbore to perform one or more wellbore operations. For example, the efficiency fluid can be positioned in the wellbore prior to a cementing operation (e.g., for a pre-cementing operation) for cleaning the wellbore. In this example, the efficiency fluid may perform a spacer operation by cleaning the wellbore (e.g., removing mud or other debris from a casing or wall of the wellbore) to prepare the wellbore for a cementing operation. Additionally, the efficiency fluid may, for example in response to performing the spacer operation, be positioned in an annulus of the wellbore and may at least partially consolidate in the annulus. The efficiency fluid may controllably consolidate over a predetermined amount of time into a gel-like material. The gel-like material may controllably consolidate in the annulus of the wellbore to prevent or to otherwise mitigate buildup of pressure in the annulus of the wellbore. Accordingly, the efficiency fluid may prevent, or otherwise reduce risk of, a collapse of the wellbore or other related damage associated with the wellbore due to pressure buildup in the annulus.

The above illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a diagram of a well system 100 having a wellbore 102 that includes an annulus 108 in which efficiency fluid can be positioned and consolidated according to one example of the present disclosure. The well system 100 can include the wellbore 102 extending through various earth strata. The wellbore 102 can extend through a subterranean formation 104 that can include hydrocarbon material such as oil, gas, coal, or other suitable material. In some examples, a casing string 106 can extend from a well surface 122 into the subterranean formation 104. The casing string 106 can provide a conduit through which formation fluids, such as production fluids produced from the subterranean formation 104, can travel to the well surface 122. Additionally, the casing string 106 can be positioned in the wellbore 102 to form the annulus 108, in some examples, between the casing string 106 and the subterranean formation 104. The casing string 106 can be coupled to walls of the wellbore 102 via cement or other suitable coupling material. For example, a cement sheath or other suitable coupling mechanism can be positioned or formed between (e.g., in the annulus 108) the casing string 106 and the walls of the wellbore 102 for coupling the casing string 106 to the wellbore 102. The casing string 106 can be coupled to the wellbore 102 using other suitable techniques.

The well system 100 can include at least one wellbore tool 110 such as a drill bit, an imaging device, a packer, or other suitable well tools for performing wellbore operations. The wellbore tool 110 can be coupled to a wireline 114, a slickline, a coiled tube, or other suitable component of the well system 100 that can be deployed into the wellbore 102. The wireline 114, the slickline, the coiled tube, etc. can be guided into the wellbore 102 using, for example, a guide, a winch, or other suitable component. In some examples, the wireline 114, the slickline, the coiled tube, etc. can be unwound from around a reel to be deployed into the wellbore 102. Performing wellbore operations with the wellbore tool 110 can involve positioning fluids (e.g., drilling mud, hydrocarbons, annular fluids, etc.) in the wellbore 102.

The fluids can be positioned in the wellbore 102 via the casing string 106, the annulus 108, or other suitable component of the wellbore 102. The fluids may be used to perform the wellbore operations. For example, drilling mud can be positioned in the wellbore 102 to aid a drilling operation, hydrocarbon fluid can be positioned in the wellbore 102 to cause a packer to swell or otherwise set, and the like. In response to completing the wellbore operations, the wellbore tool 110 may be removed from the wellbore 102, but the fluids may remain in the wellbore 102. For example, the fluids may become trapped in the annulus 108 of the wellbore.

Wellbore fluids that become trapped in the annulus 108 may absorb heat through subsequent wellbore operations. By absorbing heat, the wellbore fluids may expand in the annulus 108 of the wellbore 102 and may cause an increase of pressure in the annulus 108. This increase in pressure can be or otherwise include annular pressure-buildup. Annular pressure-buildup can cause damage to the well system 100. For example, the annular pressure-buildup can cause cracks to form in the casing string 106, which can lead to leakage of fluid, reduced production potential from the well system 100, etc. Additionally, if not addressed, damage to the casing string 106 caused by annular pressure-buildup can cause the well system 100 or the wellbore 102 to collapse.

A treatment fluid, a mixture, a solution, or the like can be positioned in the wellbore 102 for controlling annular pressure-buildup. The treatment fluid can include an efficiency fluid or other suitable type of fluid usable for controlling annular pressure-buildup. The treatment fluid can include a base fluid (e.g., water) and a pozzolanic material (e.g., a crushed or recycled glass material) that can be dispersed within the fluid. The treatment fluid can include other suitable components. The treatment fluid can be positioned in the annulus 108 of the wellbore 102 via the casing string 106, via the annulus 108, or via other suitable components of the well system 100. Positioning the treatment fluid in the annulus 108 of the wellbore 102 may displace other wellbore fluids (e.g., fluids that can cause the well system 100 or any component thereof to collapse) or may provide a buffer-zone for the other wellbore fluids for controlling annular pressure-buildup in the wellbore 102.

The treatment fluid can controllably consolidate while in the annulus 108 of the wellbore 102. Controlled consolidation of the treatment fluid may involve at least partially setting the treatment fluid over a controlled or otherwise predetermined period of time to cause the treatment fluid to transition from a liquid phase to a semi-solid phase such as a gel-like material. The consolidated treatment fluid may include or occupy a volume that is equal to or less than a volume occupied by the treatment fluid prior to controlled consolidation. The consolidated treatment fluid may include a hardness or a compressibility between those of a liquid (e.g., the treatment fluid prior to controlled consolidation) and those of a cement. The consolidated treatment fluid may not be hydraulic. For example, the consolidated treatment fluid may receive pressure but may not transmit the received pressure. Additionally, the consolidated treatment fluid may include a thermal expansion coefficient that is less than the thermal expansion coefficient of other wellbore fluids. Accordingly, upon receiving heat, the consolidated treatment fluid may not expand as much as the wellbore fluids upon receiving heat.

The well system 100 may additionally include a computing device 140, a mixing device 150, and other suitable components. The computing device 140 can be positioned at the surface 122 of the well system 100. In some examples, the computing device 140 can be positioned downhole in the wellbore 102, remote from the well system 100, or in other suitable locations with respect to the well system 100. The computing device 140 can be communicatively coupled to one or more suitable components of the well system 100 via one or more wired connections or wireless connections. For example, as illustrated in FIG. 1, the computing device 140 can include an antenna 142 that can allow the computing device 140 to receive and to send communications relating to the well system 100. The computing device 140 can receive data (e.g., data about one or more wellbore operations that may include the treatment fluid) relating to the well system 100 and may be configured to control or perform one or more tasks (e.g., mixing the treatment fluid via the mixing device 150, etc.) relating to the well system 100. The computing device 140 can perform other suitable operations with respect to the well system 100.

As illustrated in FIG. 1, the mixing device 150 can be positioned at the surface 122 of the well system 100. The mixing device 150 can be positioned in other suitable locations with respect to the well system 100. The mixing device 150 can receive components (e.g., the base fluid, the pozzolanic material, etc.) of the treatment fluid and can be used to prepare the treatment fluid prior to, or while, positioning the treatment fluid in the wellbore 102. Accordingly, the mixing device 150 can be used to prepare the treatment fluid via batch-mixing, via on-the-fly mixing (e.g., while the treatment fluid is being positioned in the wellbore 102), or via other suitable mixing techniques.

Figure 2:
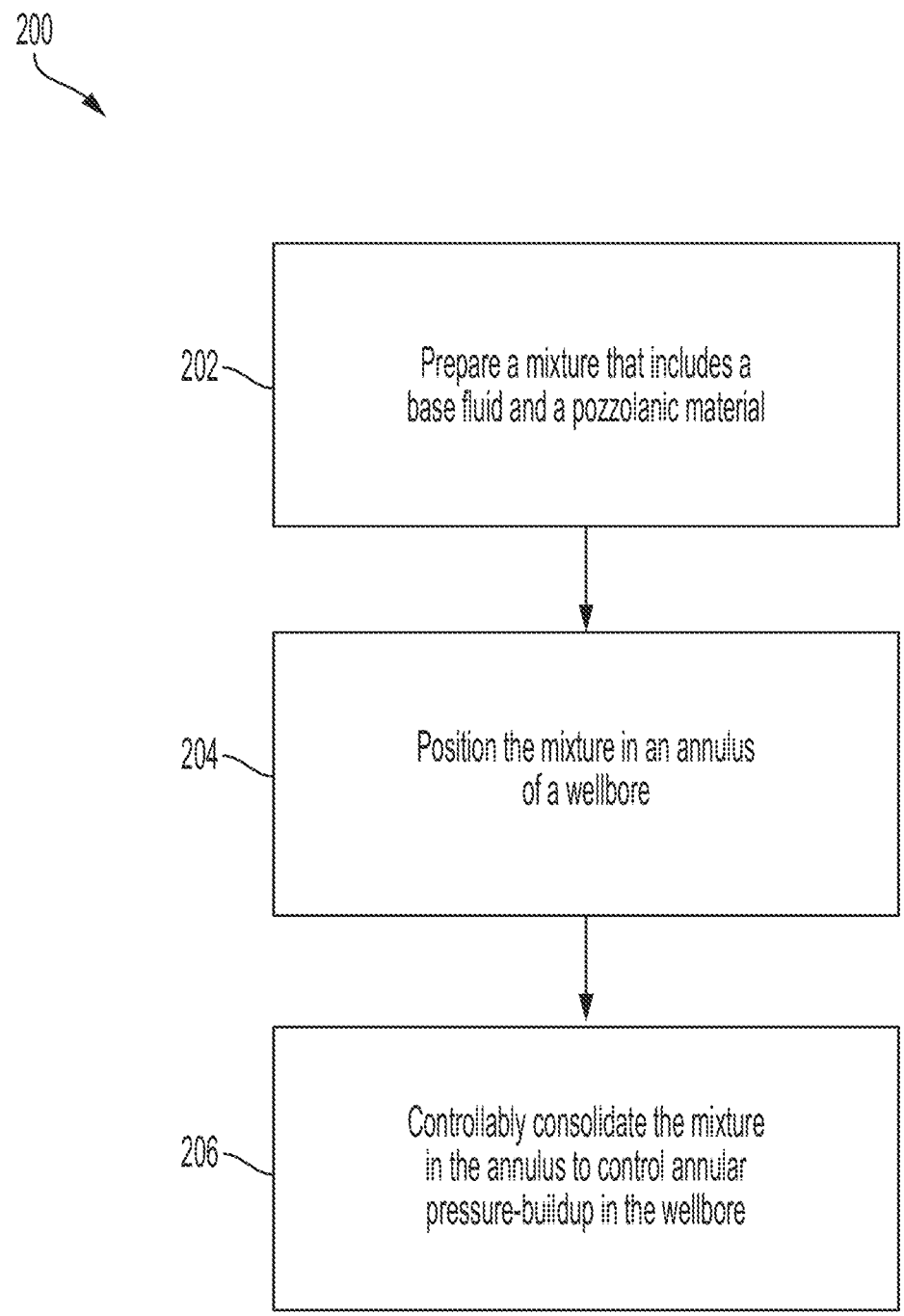
FIG. 2 is a flowchart of a process to consolidate a treatment fluid having a pozzolanic material in a wellbore for controlling annular pressure-buildup in the wellbore according to one example of the present disclosure.

FIG. 2 is a flowchart of a process 200 to consolidate a treatment fluid having a pozzolanic material in a wellbore 102 for controlling annular pressure-buildup in the wellbore 102 according to one example of the present disclosure. At block 202, a treatment fluid is prepared. The treatment fluid, or other suitable mixture or solution, can include a base fluid and a pozzolanic material. The treatment fluid can include other suitable components or precursors. The base fluid can include water or other suitable base fluids (e.g., wellbore fluids, spacer fluids, etc.). The pozzolanic material can be dispersed within the base fluid and can include one or more types of glass material (e.g., the crushed glass material, glass bubbles, etc.), clays (e.g., calcined clays, kaolinite clays, etc.), ash (e.g., fly ash, bottom ash, etc.), volcanic rock, cenospheres, diatomaceous earth, shale, zeolite, ground vitrified pipe, or other suitable pozzolanic material.

The treatment fluid can be prepared using various techniques. For example, the treatment fluid can be prepared via batch-mixing in which the components of the treatment fluid can be mixed prior to positioning the treatment fluid in a wellbore. Alternatively, the treatment fluid can be prepared on-the-fly (e.g., mixing components of the treatment fluid in a mixing device and simultaneously pumping downhole) or otherwise while the components of the treatment fluid are being mixed. The treatment fluid can be prepared using other suitable techniques. The treatment fluid can be prepared using the mixing device 150 or other suitable component of the well system 100.

At block 204, the treatment fluid is positioned in an annulus 108 of the wellbore 102. The treatment fluid can be positioned in the annulus 108 directly or indirectly via other suitable components (e.g., the casing string 106) of the wellbore 102. In some examples, the treatment fluid can be positioned in the annulus 108 of the wellbore 102 using the mixing device 150 or other suitable component of the well system 100. By positioning the treatment fluid in the annulus 108, the treatment fluid may displace wellbore fluids trapped in the annulus 108. Alternatively, the treatment fluid may provide a buffer-zone that can allow the wellbore fluids to expand without damaging the well system 100 or any component thereof.

At block 206, the treatment fluid is controllably consolidated in the annulus 108 of the wellbore 102. The treatment fluid can be controllably consolidated to control, prevent, or otherwise mitigate pressure-buildup in the annulus 108 of the wellbore 102. The treatment fluid may be controllably consolidated by exposing the treatment fluid to heat, exposing the treatment fluid to pressure, exposing the treatment fluid to a catalytic additive, or via other suitable techniques. The treatment fluid may controllably consolidate over a predetermined amount of time. For example, the treatment fluid may be controllably consolidated over a period of hours, days, weeks, etc. Controllable consolidation of the treatment fluid, in some examples, may involve at least partially setting the treatment fluid into a gel-like, or semi-solid, material.

In response to controllably consolidating, the consolidated treatment fluid may control annular pressure-buildup in the annulus 108 of the wellbore 102. For example, the consolidated treatment fluid may include a measure of strength or compressibility that may be between those of a fluid (e.g., the treatment fluid prior to controlled consolidation) and those of a solid (e.g., cement or a cementitious material). Accordingly, the consolidated treatment fluid may be non-hydraulic such that, while the consolidated treatment fluid can receive pressure, the consolidated treatment fluid may not transmit any received pressure, which may prevent or mitigate annular pressure-buildup. Additionally, the consolidated treatment fluid, upon controlled consolidation, may occupy a volume that is smaller than the volume of the treatment fluid prior to controlled consolidation, which can provide the buffer-zone for the trapped wellbore fluids. The consolidated treatment fluid may include a thermal expansion coefficient that is smaller than the thermal expansion coefficient of the trapped wellbore fluids. For example, upon receiving heat, the consolidated treatment fluid may expand less than the wellbore fluids in response to receiving an identical amount of heat. The smaller thermal expansion coefficient may allow the consolidated treatment fluid to receive more heat (e.g., compared to other wellbore fluids) before causing any damage to components of the well system 100.

In some examples, the treatment fluid can be formulated with water, recycled glass material, and hydrated lime. The recycled glass material can be dispersed in the water to 12.8 pounds per gallon (1,534 kg/L) density. The percent weight of each component may be 49.5% for recycled glass material, 9.9% for hydrated lime, and 40.6% for water. The treatment fluid, in this example, may be exposed to heat (e.g., 140° F. or 60° C., etc.) to controllably consolidate. After controllably consolidating over a predetermined amount of time (e.g., a week, etc.), the treatment fluid may include a compressive strength of 58 psi (400 kPa).

In other examples, the treatment fluid can be formulated with water, cement kiln dust, and hydrated lime. The cement kiln dust can be dispersed in the water to 13.4 pounds per gallon (1,606 kg/L) density. The percent weight of each component may be 50.8% for cement kiln dust, 10.2% for hydrated lime, and 39.0% for water. The treatment fluid, in this example, may be exposed to heat (e.g., 140° F. or 60° C., etc.) to controllably consolidate. After controllably consolidating over a predetermined amount of time (e.g., a week, etc.), the treatment fluid may include a compressive strength of 48 psi (331 kPa).

In yet other examples, the treatment fluid can be formulated with water, expanded perlite, and hydrated lime. The expanded perlite can be dispersed in the water to 10.2 pounds per gallon (1,222 kg/L) density. The percent weight of each component may be 26.8% for expanded perlite, 5.4% for hydrated lime, and 67.8% for water. The treatment fluid, in this example, may be exposed to heat (e.g., 140° F. or 60° C., etc.) to controllably consolidate. After controllably consolidating over a predetermined amount of time (e.g., a week, etc.), the treatment fluid may include a compressive strength of 79 psi (545 kPa).

In some examples, the treatment fluid can additionally include other suitable additives. The additives may include cement additives, which can include cement retarders, dispersants, suspending aids, or other suitable cement additives. The additives can be included in a pozzolanic treatment fluid (e.g., the well treatment fluid described herein) to control (e.g., the rate of consolidation, etc.) the pozzolanic treatment fluid.

In some examples, the treatment fluid may be prepared (e.g., via batch-mixing, etc.) prior to positioning the treatment fluid in the wellbore 102, and the treatment fluid, subsequent to preparation, may be retained, for example, as a liquid in normal conditions for a predetermined amount of time. The normal conditions may include room temperature, atmospheric pressure, and other suitable normal conditions. The normal conditions may alternatively include temperature, pressure, and other measures from the well surface 122. The predetermined amount of time can include days, weeks, months, years, or other suitable amount of time. In one example, the treatment fluid can be prepared and retained for six months prior to consolidation. The treatment fluid can be positioned in the wellbore 102 during the predetermined amount of time, subsequent to the predetermined amount of time, or at any other suitable time. Subsequent to the predetermined amount of time elapsing, the treatment fluid can be activated to consolidate. For example, the treatment fluid can be exposed to heat (e.g., wellbore heat, etc.) or other suitable catalytic process (e.g., ultrasonic waves, chemical reactions, etc.) for controllably consolidating the treatment fluid. In this example, the treatment fluid may not be hydraulic.

Figure 3:
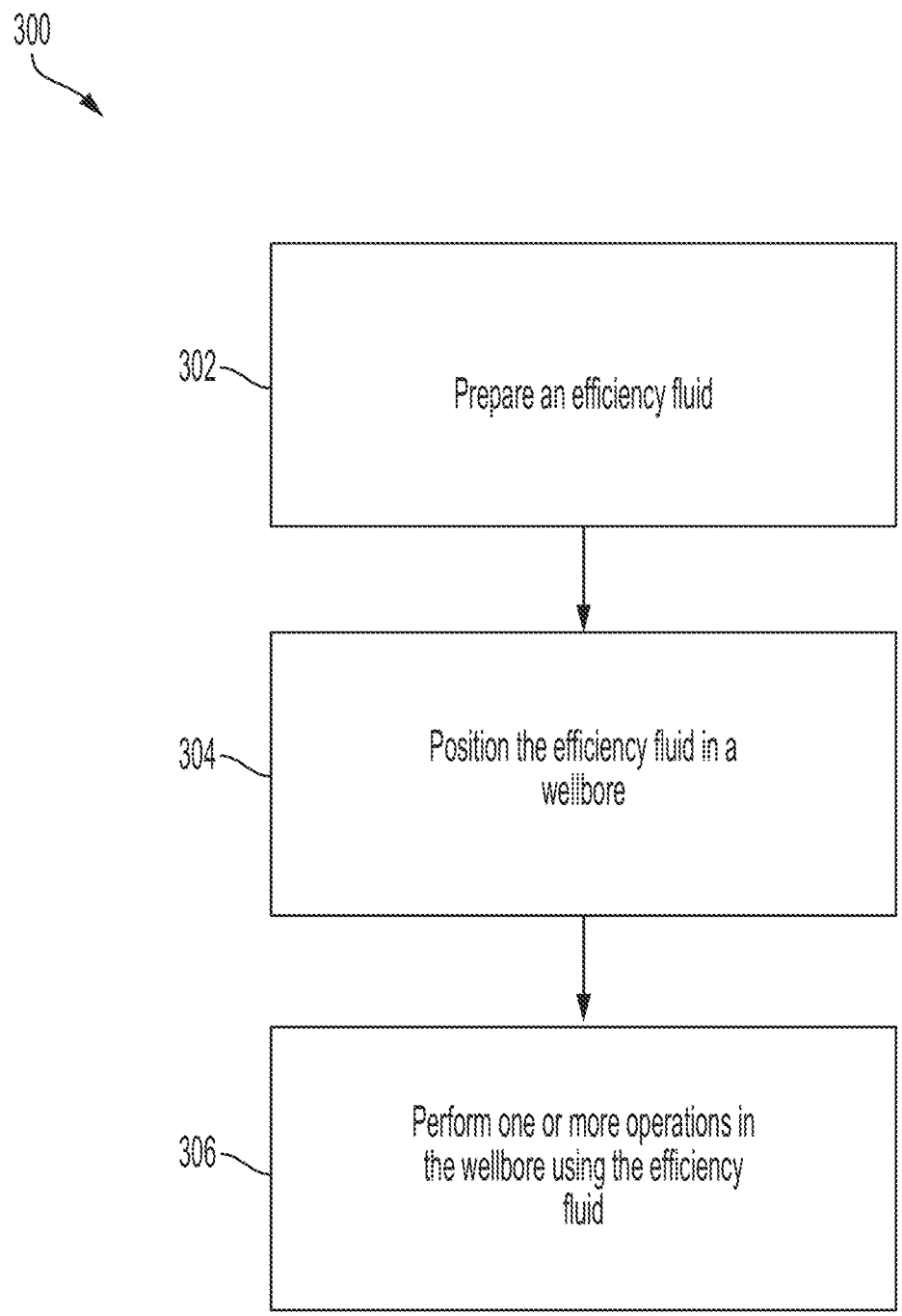
FIG. 3 is a flowchart of a process to use an efficiency fluid in a wellbore to perform one or more wellbore operations according to one example of the present disclosure.

FIG. 3 is a flowchart of a process 300 to use an efficiency fluid in a wellbore 102 to perform one or more wellbore operations according to one example of the present disclosure. At block 302, an efficiency fluid is prepared. In some examples, the efficiency fluid can be similar or identical to the treatment fluid described with respect to the process 200. For example, the efficiency fluid can include a base fluid (e.g., water, spacer fluids, etc.) and a pozzolanic material (e.g., glass material, clays, etc.). The efficiency fluid can include other suitable components or precursors such as a setting agent (e.g., hydrated lime, etc.).

At block 304, the efficiency fluid is positioned in the wellbore 102. The efficiency fluid can be positioned in the casing string 106 of the wellbore 102, in the annulus 108 of the wellbore 102, in a combination thereof, or in other suitable locations with respect to the well system 100. In some examples, the mixing device 150 of the well system 100 can prepare (e.g., via batch-mixing, on-the-fly mixing, etc.) and position the efficiency fluid in the wellbore 102. The efficiency fluid can be positioned in the wellbore 102 via other suitable techniques.

At block 306, one or more operations are performed in the wellbore 102 using the efficiency fluid. For example, the efficiency fluid can perform spacer operations in the wellbore 102. Spacer operations can include cleaning the wellbore 102 by removing mud and other suitable debris from walls of the wellbore 102, the casing string 106 of the wellbore 102, the annulus 108 of the wellbore 102, or from other locations of the wellbore 102. In some examples, the efficiency fluid can be positioned in the wellbore 102 to perform the spacer operations prior to other suitable wellbore operations such as cementing operations, etc.

Additionally, the efficiency fluid can perform operations similar or identical to the treatment fluid described with respect to the process 200. For example, subsequent to performing the spacer operations, the efficiency fluid can controllably consolidate in the annulus 108 of the wellbore 102 for controlling annular pressure-buildup in the wellbore 102. The efficiency fluid may be controllably consolidated by exposing the efficiency fluid to heat, to pressure, to a catalytic additive, or via other suitable techniques. The efficiency fluid may controllably consolidate over a predetermined amount of time. For example, the efficiency fluid may be controllably consolidated over a period of hours, days, weeks, etc. In response to controlled consolidation, the efficiency fluid may become or otherwise include a gel-like, or semi-solid, material.

The consolidated efficiency fluid may control annular pressure-buildup in the annulus 108 of the wellbore 102. For example, the consolidated efficiency fluid may include a measure of strength or compressibility that may be between those of a fluid (e.g., the efficiency fluid prior to controlled consolidation) and those of a solid (e.g., cement or a cementitious material). Accordingly, the consolidated efficiency fluid may be non-hydraulic such that, while the consolidated efficiency fluid can receive pressure, the consolidated efficiency fluid may not transmit any received pressure, which may prevent or mitigate annular pressure-buildup. Additionally, the consolidated efficiency fluid may occupy a volume that is smaller than the volume of the efficiency fluid prior to controlled consolidation, which can provide the buffer-zone for the trapped wellbore fluids.

The consolidated efficiency fluid may include a thermal expansion coefficient that is smaller than the thermal expansion coefficient of the trapped wellbore fluids. For example, upon receiving heat, the consolidated efficiency fluid may expand less than the wellbore fluids in response to receiving an identical amount of heat. The smaller thermal expansion coefficient may allow the consolidated efficiency fluid to receive more heat before causing any damage to the well system 100 or any components thereof.

In some aspects, methods, treatment fluids, and efficiency fluids for controlling annular pressure-buildup in a wellbore are provided according to one or more of the following examples.

As used below, any reference to a series of examples is to be understood as a reference to each of those examples disjunctively (e.g., "Examples 1-4" is to be understood as "Examples 1, 2, 3, or 4").

Example 1 is a method comprising: preparing a treatment fluid that includes a base fluid and a pozzolanic material that is dispersed within the base fluid; positioning the treatment fluid in an annulus of a wellbore; and controllably consolidating the treatment fluid in the annulus of the wellbore to control annular pressure-buildup in the wellbore.

Example 2 is the method of example 1, wherein controllably consolidating the treatment fluid in the annulus of the wellbore includes exposing the treatment fluid to heat, to pressure, or to a catalytic additive to controllably consolidate the treatment fluid.

Example 3 is the method of example 1, wherein the base fluid comprises water, the pozzolanic material comprises a crushed, recycled glass material, and wherein the treatment fluid further comprises a setting agent that comprises hydrated lime dispersed within the base fluid for facilitating controlled consolidation of the treatment fluid.

Example 4 is the method of example 1, wherein positioning the treatment fluid in the annulus of the wellbore includes positioning the treatment fluid in the wellbore for performing a spacer operation in which the treatment fluid cleans the wellbore prior to a cementing operation.

Example 5 is the method of example 1, wherein controllably consolidating the treatment fluid in the annulus of the wellbore includes controllably consolidating the treatment fluid into a gel-like material that does not hydraulically transmit pressure.

Example 6 is the method of any of examples 1 and 5, wherein the gel-like material includes a first compressive strength that is greater than a second compressive strength associated with the treatment fluid prior to controlled consolidation and less than a third compressive strength associated with cement.

Example 7 is the method of example 1, wherein a first volume of the treatment fluid before controllably consolidating the treatment fluid is larger than a second volume of the treatment fluid after controllably consolidating the treatment fluid.

Example 8 is a treatment fluid comprising: a base fluid; and a pozzolanic material dispersed within the base fluid to allow the treatment fluid to perform a spacer operation in a wellbore and then to controllably consolidate in an annulus of the wellbore for controlling annular pressure-buildup in the wellbore.

Example 9 is the treatment fluid of example 8, wherein the treatment fluid is controllably consolidatable by exposing the treatment fluid to heat, to pressure, or to a catalytic additive.

Example 10 is the treatment fluid of example 8, wherein the base fluid comprises water, the pozzolanic material comprises a crushed, recycled glass material, further comprising a setting agent that comprises hydrated lime dispersed within the base fluid for facilitating controlled consolidation of the treatment fluid.

Example 11 is the treatment fluid of example 8, wherein the spacer operation involves cleaning the wellbore prior to a cementing operation.

Example 12 is the treatment fluid of example 8, wherein the treatment fluid is controllably consolidatable into a gel-like material that does not hydraulically transmit pressure.

Example 13 is the treatment fluid of any of examples 8 and 12, wherein the gel-like material includes a first compressive strength that is greater than a second compressive strength associated with the treatment fluid prior to controlled consolidation and less than a third compressive strength associated with cement.

Example 14 is the treatment fluid of example 8, wherein a first volume of the treatment fluid before controllably consolidating the treatment fluid is larger than a second volume of the treatment fluid after controllably consolidating the treatment fluid.

Example 15 is an efficiency fluid comprising: a base fluid; a setting agent dispersed within the base fluid; and a pozzolanic material dispersed within the base fluid for controllably consolidating the efficiency fluid in an annulus of a wellbore for controlling annular pressure-buildup in the wellbore.

Example 16 is the efficiency fluid of example 15, wherein the efficiency fluid is controllably consolidatable by exposing the efficiency fluid to heat, to pressure, or to a catalytic additive.

Example 17 is the efficiency fluid of example 15, wherein the base fluid comprises water, the pozzolanic material comprises a crushed, recycled glass material, and wherein the setting agent comprises hydrated lime dispersed within the base fluid for facilitating controlled consolidation of the efficiency fluid.

Example 18 is the efficiency fluid of example 15, wherein the efficiency fluid is positionable in the wellbore for performing a spacer operation in which the efficiency fluid cleans the wellbore prior to a cementing operation.

Example 19 is the efficiency fluid of example 15, wherein the efficiency fluid is controllably consolidatable into a gel-like material that does not hydraulically transmit pressure, and wherein the gel-like material includes a first compressive strength that is greater than a second compressive strength associated with the efficiency fluid prior to controlled consolidation and less than a third compressive strength associated with cement.

Example 20 is the efficiency fluid of example 15, wherein a first volume of the efficiency fluid before controllably consolidating the efficiency fluid is larger than a second volume of the efficiency fluid after controllably consolidating the efficiency fluid.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. An efficiency fluid comprising:
   a base fluid;
   a setting agent dispersed within the base fluid, the setting agent comprising hydrated lime; and
   a recycled glass material dispersed within the base fluid for controllably consolidating the efficiency fluid in an annulus of a wellbore for controlling annular pressure-buildup in the wellbore, wherein subsequent to controllably consolidating in the annulus, the efficiency fluid is a non-hydraulic fluid.

2. The efficiency fluid of claim 1, wherein the efficiency fluid is controllably consolidatable by exposing the efficiency fluid to heat or to ultrasonic waves.

3. The efficiency fluid of claim 1, wherein the base fluid comprises water, and wherein the setting agent comprises hydrated lime dispersed within the base fluid for facilitating controlled consolidation of the efficiency fluid.

4. The efficiency fluid of claim 1, wherein the efficiency fluid is positionable in the wellbore for performing a spacer operation in which the efficiency fluid cleans the wellbore prior to a cementing operation.

5. The efficiency fluid of claim 1, wherein the efficiency fluid is controllably consolidatable into a gel-like material that does not hydraulically transmit pressure, and wherein the gel-like material includes a first compressive strength that is greater than a second compressive strength associated with the efficiency fluid prior to controlled consolidation and less than a third compressive strength associated with cement.

6. The efficiency fluid of claim 1, wherein a first volume of the efficiency fluid before controllably consolidating the efficiency fluid is larger than a second volume of the efficiency fluid after controllably consolidating the efficiency fluid.

7. A treatment fluid comprising:
a base fluid;
a setting agent dispersed within the based fluid, the setting agent comprising hydrated lime; and
a recycled glass material dispersed within the base fluid to allow the treatment fluid to perform a spacer operation in a wellbore and then to controllably consolidate in an annulus of the wellbore for controlling annular pressure-buildup in the wellbore, wherein subsequent to controllably consolidating in the annulus, the treatment fluid is a non-hydraulic fluid.

8. The treatment fluid of claim 7, wherein the treatment fluid is controllably consolidatable by exposing the treatment fluid to heat or to ultrasonic waves.

9. The treatment fluid of claim 7, wherein the treatment fluid is positionable in the wellbore for performing the spacer operation in which the treatment fluid cleans the wellbore prior to a cementing operation.

10. The treatment fluid of claim 7, wherein the treatment fluid is controllably consolidatable into a gel-like material that does not hydraulically transmit pressure.

11. The treatment fluid of claim 10, wherein the gel-like material includes a first compressive strength that is greater than a second compressive strength associated with the treatment fluid prior to controlled consolidation and less than a third compressive strength associated with cement.

12. The treatment fluid of claim 7, wherein a first volume of the treatment fluid before controllably consolidating the treatment fluid is larger than a second volume of the treatment fluid after controllably consolidating the treatment fluid.

13. The treatment fluid of claim 7, wherein:
the recycled glass material is present in an amount of about 49.5 weight percent by weight of the treatment fluid;
the hydrated lime is present in an amount of about 9.9 weight percent by weight of the treatment fluid; and
the base fluid is present in an amount of about 40.6 weight percent by weight of the treatment fluid.

14. A method comprising:
preparing a treatment fluid that includes a base fluid, a setting agent comprising hydrated lime, and a recycled glass material that is dispersed within the base fluid;
positioning the treatment fluid in an annulus of a wellbore; and
controllably consolidating the treatment fluid in the annulus of the wellbore to control annular pressure-buildup in the wellbore, wherein subsequent to controllably consolidating in the annulus, the treatment fluid is a non-hydraulic fluid.

15. The method of claim 14, wherein controllably consolidating the treatment fluid in the annulus of the wellbore includes exposing the treatment fluid to heat or to ultrasonic waves to controllably consolidate the treatment fluid.

16. The method of claim 14, wherein the base fluid comprises water.

17. The method of claim 14, wherein positioning the treatment fluid in the annulus of the wellbore includes positioning the treatment fluid in the wellbore for performing a spacer operation in which the treatment fluid cleans the wellbore prior to a cementing operation.

18. The method of claim 14, wherein controllably consolidating the treatment fluid in the annulus of the wellbore includes controllably consolidating the treatment fluid into a gel-like material that does not hydraulically transmit pressure.

19. The method of claim 18, wherein the gel-like material includes a first compressive strength that is greater than a second compressive strength associated with the treatment fluid prior to controlled consolidation and less than a third compressive strength associated with cement.

20. The method of claim 14, wherein a first volume of the treatment fluid before controllably consolidating the treatment fluid is larger than a second volume of the treatment fluid after controllably consolidating the treatment fluid.

* * * * *